United States Patent Office.

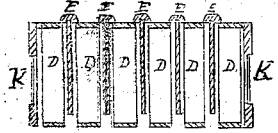 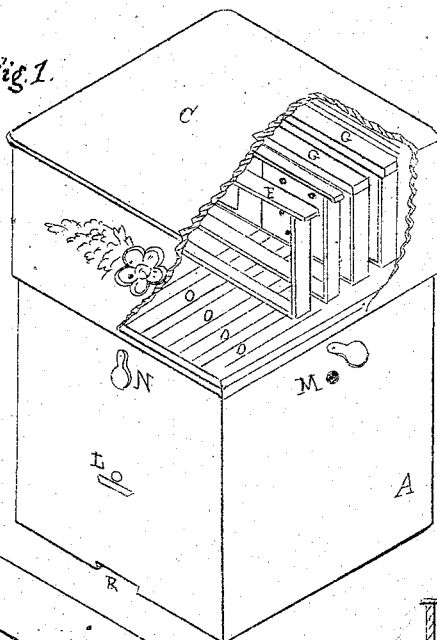

P. J. SEVERSON, OF KNOWERSVILLE, NEW YORK.

Letters Patent No. 74,854, dated February 25, 1868.

---

IMPROVEMENT IN BEE-HIVES.

---

*The Schedule referred to in these Letters Patent and making part of the same.*

---

TO ALL WHOM IT MAY CONCERN:

Be it known that I, P. J. SEVERSON, of Knowersville, in the county of Albany, and State of New York, have invented a new and improved Bee-Hive; and I do hereby declare that the following is a full, clear, and exact description thereof, which will enable others skilled in the art to make and use the same, reference being had to the accompanying drawings forming part of this specification, in which—

Figure 1 is a perspective view of my invention.

Figure 2 is a vertical central section of surplus-honey box, taken in the plane of a line running from front to back of box.

Figure 3 is a perspective view of one double-comb frame, D, also showing a full, even honey-comb.

Figure 4 is a front elevation of one comb-frame, D, and one separator, E.

Figure 5 is a view of one separator, E, inverted for the purpose of showing its guide-pins H.

Figure 6 is a vertical central section of surplus-honey box B and main hive A, combined.

Figure 7 is a perspective view of one double separator E.

Figure 8 is a horizontal central section through one of the comb-frames, O, of main hive A.

Figure 9 is a view of one corner of surplus-honey box B.

Similar letters of reference indicate like parts in all the drawings.

The object of this invention is the construction of a bee-hive that will give the honey-bee the greatest facilities for storing surplus honey, and also having the honey-combs made of a better form and size than usual for table use, thus giving the honey so stored the highest market value by its compact form and neat appearance.

My invention consists in the construction of comb-frames and division-wire pins on a cross-bar near the bottom of the main hive; also, in the construction of a surplus-store honey-box, as will be hereinafter described.

A designates the main hive, which is about twelve inches square, (inside,) and sixteen inches deep, and has an upper and lower entrance, L and R, as shown in fig. 1, and also ventilating-holes M, with their sliding covers, N, placed near the top of the hive. The outer edges of the top of main hive A are rabbeted to receive the cover C of surplus-honey box, as shown at $f$ in fig. 6. The inner, front, and back top edges of main hive A are rabbeted to receive the ends of top-bars of comb-frames O, which top-bars extend into this rabbet the same as the ends of top-bars F, of double surplus frames D extend into their rabbets, as shown at $f'$ in fig. 4.

I construct the comb-frames O of the main hive of a rectangular form, and having the inner edge of their top and side-pieces made diamond-shaped, as shown at $b$, in figs. 6 and 8, and their bottom-bar as shown at $c$, in fig. 6. Near the bottom, and extending across the main hive A, and at equal distances from front to back, I place a triangular bar, P, with one of its salient angles upwards, a longitudinal section of which is shown in fig. 6. Along the top of triangular bar P, and at distances corresponding to the width of comb-frames O of main hive A, I insert wire guides, of a triangular form, as shown at $d$ in fig. 6. The object of these triangular wire guides $d$ is to keep the comb-frames O of the main hive A at proper distances apart at their bottoms. Their tops or upper parts, being visible, may be easily adjusted and secured in place by any of the usual and well-known methods.

The surplus-honey box B, figs. 6 and 9, may be about thirteen and one-quarter inches square, (outside,) and five and one-half inches deep. It sets upon the top of the main hive A, as shown in fig. 6, and is held in place by pins $g$, fastened to or in its lower edge, as shown in fig. 4, said pins having corresponding holes in the top of main hive A. The front and rear ends of surplus-honey box B are provided with glass, K, which is held in place by sliding it along into rabbets $h\ h$, cut into top and bottom strips of wood, X X, and then inserting pieces of wood, R, against each end of the glass, as shown in fig. 9. By removing one of these pieces R the glass, K, may be taken out to be cleaned, or, if broken, another piece may be replaced without difficulty.

The double surplus comb-frames D D are constructed as shown in fig. 6. They may be about one and three-quarter inch wide, this width being such as to allow a full and well-made comb of convenient size to be made in them. The top-piece or bar F is twelve and one-half inches long, and extends across the surplus-box B, and rests into rabbets $f'$ at the top of surplus-box B, as shown in fig. 4. The double comb-frames D D are five inches square, and are fastened to their top-pieces F in such a manner as to leave a space, $s$, between them in the centre of the surplus-box B, and a space, $s'$, between these double frames and the sides of box B, and a space, $s''$, between the bottoms of these double frames and the tops of comb-frames O in main hive A, as shown in figs. 4 and 6. These several spaces may be three-eighths or one-half an inch wide, so as to give the bees free access to any and every part of the surplus-box B, and also to and from the main hive A. Between the double frames D D, I place wooden separators, constructed as shown in fig. 7. The top-piece G of the separator is thirteen and one-quarter inches long, and one and one-eighth inch wide, and five-eighths of an inch thick on the under side, and in the centre of this piece longitudinally I cut a groove, $m$, about three-eighths of an inch deep, and one-fourth of an inch wide, to receive the separating-boards E, which are secured in place by pins K K, as shown in fig. 5. These separators, which are five inches long and four and one-half inches wide, have holes $a\ a$ in them, of about three-eighths of an inch diameter, for the purpose of equalizing the temperature within the surplus-box B. On the under side, and near each end of the top-bars G of separators E, are inserted pins H, which regulate the distance of the double comb-frames D from the separators E. When the surplus-box B is not in use, the top of the main hive may be covered with a square board, termed a honey-board.

It will be seen by the above description that by the use of a surplus-honey box, made as above described, the bees will have a convenient and comfortable place provided for them, in which to store surplus honey. The combs, not being thicker than the comb-frames, which are one and three-quarter inch in width, and but five inches square, form a very marketable article.

An equal amount of honey, if divided into two combs, will be finished sooner than if in one comb, for, there being four working-surfaces instead of two, it is evident that twice the number of bees can work on the former that can on the latter. The pins H, on the under side of separator top-bar G, determine the distances of the separating-boards E from the double frames D, and also the thickness of the honey-comb, as the bees leave only a working-space between the combs and the separating-boards.

By removing cap or cover C of surplus-box B, we can ascertain the progress of the bees in filling the comb-frames D, and whenever we find the outside frames capped we will also find the whole of them in the same condition, and ready for removal.

The inspection of the combs is made by means of glass, K, in the front and rear of surplus-store honey-box B, as above described. Should any of the frames be filled and capped ready for removal before the rest, they can be removed, and empty frames put in their place, without disturbing the bees, or causing any irregularity of combs.

I do not claim broadly the use of separators between comb-frames in bee-hives, nor a surplus-honey box, these having been made and used before. Neither do I claim the use of glass in a bee-hive, that having been used before.

What I claim as new, and desire to secure by Letters Patent, is—

1. Separators E, when constructed with top-bar G and pins H, substantially as and for the purpose described.

2. The double comb-frames D, in combination with spaces $s\ s'\ s''$ and separators E, substantially as herein set forth.

3. Surplus-honey box B, with its cap or cover C, and double comb-frames D D, and separators E, when constructed in the manner and for the purpose as herein described.

P. J. SEVERSON.

Witnesses:
JAS. GRAY,
THOS. HOUGHTON.